United States Patent Office 3,661,809
Patented May 9, 1972

3,661,809
FLAME RETARDANT POLYURETHANE FOAM
James J. Pitts, Wallingford, Conn., assignor to Olin Corporation
No Drawing. Filed Aug. 28, 1970, Ser. No. 67,983
Int. Cl. C08g 22/44, 51/56
U.S. Cl. 260—2.5 AJ
22 Claims

ABSTRACT OF THE DISCLOSURE

Certain metal ammine complexes are utiilzed as flame-retardant additives for polyurethane foam.

---

This invention relates to flame-retardant polyurethane foam compositions and more specifically to the use of certain metal ammine complexes as flame-retardant additives for polyurethane foam.

The wide range of utility of polyurethane foam has been somewhat circumscribed by its flammability. Consequently, numerous efforts have been made in recent years to develop ways of imparting flame-retardance to the foam. Such efforts have produced a variety of fire-suppressing or flame-retardant compounds which are either incorporated in the polyurethane pre-polymer mix or applied to the polyurethane after foaming.

In the general flame proofing art, the ammoniates, sulfates, chlorides, and sulfochlorides of bivalent and multivalent metals have been known to have some flame proofing properties in certain applications. This is disclosed, for example, in Czech Patent No. 92,236. Also the use of antimony oxychloride as a flame-retardant additive has been known in the art. See for example British Patent No. 924,945. However, to be effective, relatively expensive amounts of this antimony compound must be used, and this renders it economically unattractive.

The success of a flame-retardant additive for polyurethane foam depends on its meeting at least three requirements. It must first have no detrimental effect on the foam, nor considerably alter the basic properties of the foam. Secondly, it must be relatively easy to produce or obtain and economically feasible to use in the manufacture of foam. Thirdly the additive must not be fugitive. The term "fugitive" is used to describe a compound whose flame-retardant effectiveness is greatly diminished when foam containing it is subjected to aging. Many of the flame-retardant additives developed in the prior art have been found unsatisfactory inasmuch as they do not measure up to all of these requirements.

It is a primary object of this invention to provide a select group of flame-retardant additives which overcome the drawbacks of the prior art. Another object is to provide a group of metal ammine complexes which are economically feasible to use as effective flame-retardants in polyurethane foam. A further object is to provide polyurethane foam compositions containing flame-retardant additives which are non-fugitive, i.e., their effectiveness is not substantially diminished through aging of the polyurethane foam. These and other objects will become apparent from the following description.

The above objects are accomplished, in accordance with this invention, by incorporating in a polyurethane foam forming formulation a flame-retarding amount of a transition metal ammine complex with commences to decompose at a temperature between about 100° and about 500° and thereby to release ammonia.

Typical transition metals in the complexes which are employed according to the invention are those having atomic numbers of 21–30, 39–48, and 72–80. However, transition metals having an atomic number of 24–30 are preferred.

Illustrative of the transition metal ammine complexes employed according to the invention are those represented by the formula $$[M(NH_3)_pY_t]_sX_r \cdot nH_2O$$

wherein

M is a transition metal,
$p$ is an integer from 1 to 6,
Y is selected from the group consisting of $Cl^-$, $Br^-$, $I^-$, $C_2O_4^{-2}$, $NO_2^-$, $NO_3^-$, $OH^-$, $H_2O$, and mixtures thereof,
$t$ is an integer from 0 to 3,
$s$ is an integer from 1 to 3,
X is an anion selected from the group consisting of $Cl^-$, $Br^-$, $I^-$, $PO_4^{-3}$, $HPO_4^{-2}$, $H_2PO_4^{-1}$, $B_4O_7^{-2}$, $BO_2^-$, $SO_4^{-2}$, $C_2O_4^{-2}$, $WO_4^{-2}$, $MoO_4^{-2}$, $VO_3^-$, $BF_4^-$, $NO_3^-$, $TlCl_6^{-2}$, $InCl_6^{-3}$, $ReO_4^-$, $PtCl_4^{-2}$, $PtCl_6^{-2}$, $PdCl_4^{-2}$, $CO_3^{-2}$, $SiF_6^{-2}$, and mixtures thereof,
$r$ is an integer from 1 to 3, and
$n$ is 0–3.

The ammine complexes are employed as flame-retardant additives in polyurethane foam by incorporating them in the polyurethane foam-forming formulation prior to foaming. The resulting foam is rendered flame-retardant, according to ASTM–D–1692–68, and this flame-retardant property is not substantially diminished by aging of the polyurethane foam.

Illustrative of the metal ammine complexes encompassed by Formula I above which are utilized as additives in the flame-extinguishing polyurethane foam compositions of the invention are the following:

$Cd(NH_3)_2Cl_2$
$Cd(NH_3)_2Br_2$
$Cd(NH_3)_2I_2$
$Cd(NH_3)Br_2$
$Cd(NH_3)Br_2$
$Cd(NH_3)_4(ReO_4)_2$
$Mn(NH_3)_2Cl_2$
$Mn(NH_3)_2Br_2$
$Mn(NH_3)_2I_2$
$Cr(NH_3)_6Cl_3$
$Cr(NH_3)_6Br_3$
$Cr(NH_3)_6I_3$
$Cr(NH_3)_3ClBr_2$
$Cr(NH_3)_3Cl_2Br$
$Cr(NH_3)_5Cl_3$
$Cr(NH_3)_5Br_3$
$Cr(NH_3)_5(H_2O)Cl_3$
$Cr(NH_3)_4(H_2O)_2Cl_3$
$Cr(NH_3)_3C_2O_4Cl$
$Ni(NH_3)_6(BF_4)_2$
$Ni(NH_3)_6Cl_2$
$Ni(NH_3)_6Br_2$
$Ni(NH_3)_6I_2$
$Ni(NH_3)_6SO_4$
$Ni(NH_3)_6MoO_4$
$Ni(NH_3)_6WO_4$
$Cu(NH_3)Cl_2$
$Cu(NH_3)_6Br_2$
$Cu(NH_3)_6I_2$
$Cu(NH_3)_5(H_2O)Cl_2$
$Cu(NH_3)_5(H_2O)Br_2$
$Cu(NH_3)_2(H_2O)Cl_2$
$Cu(NH_3)_2Cl_2$
$Cu(NH_3)_2Br_2$
$Cu(NH_3)Cl_2$
$Cu(NH_3)Br_2$
$Cu(NH_3)_4SO_4$
$Cu(NH_3)_4SO_4 \cdot H_2O$
$Sc(NH_3)_5Cl_3$
$Sc(NH_3)_4Cl_3$ $Zn(NH_3)_4(ReO_4)_2$
$Zn(NH_3)_2Cl_2$
$Zn(NH_3)_4I_2 \cdot H_2O$
$Zn(NH_3)_4Br_2$
$Zn(NH_3)_4SO_4 \cdot 2H_2O$
$Zn(NH_3)_4(ReO_4)_2$
$Rh(NH_3)_6Cl_3$
$Rh(NH_3)_5Cl_3$
$Rh(NH_3)_5Br_3$
$Rh(NH_3)_5I_3$
$Rh(NH_3)_5(H_2O)Cl_3$
$Rh(NH_3)_5(H_2O)Br_3$
$Rh(NH_3)_5(H_2O)I_3$
$Rh(NH_3)_5ClBr_2$
$Co(NH_3)_6Cl_3$
$Co(NH_3)_6Br_3$
$Co(NH_3)_6PO_4$
$Co(NH_3)_6BrSO_4$
$Co(NH_3)_5(H_2O)Cl_3$
$Co(NH_3)_5(H_2O)Br_3$
$Co(NH_3)_5(H_2O)I_3$
$Co(NH_3)_5(H_2O)SO_4Br$
$Co(NH_3)_5Cl_3$
$Co(NH_3)_5ClBr_2$
$Co(NH_3)_5ClI_2$
$Co(NH_3)_5Br_3$
$Co(NH_3)_5BrCl_2$
$Co(NH_3)_5BrI_2$
$Co(NH_3)_5I_3$
$Co(NH_3)_5ICl_2$
$Co(NH_3)_5IBr_2$
$Co(NH_3)_4ClC_2O_4$
$Co(NH_3)_4BrC_2O_4$
$Co(NH_3)_4Cl_3 \cdot H_2O$
$Co(NH_4)_6Cl_2$
$Co(NH_3)_6Br_2$
$Co(NH_3)_6I_2$
$Co(NH_3)_2Cl_2$
$Co(NH_3)_2Br_2$
$Co(NH_3)_2I_2$ $Pd(NH_3)_4Cl_2$
$Pd(NH_3)_4Br_2$
$Pd(NH_3)_4I_2$
$Pd(NH_3)_4SO_4 \cdot H_2O$
$Pd(NH_3)_2Cl_2$
$Pd(NH_3)_2Br_2$
$Pd(NH_3)_2I_2$
$Pt(NH_3)_4Cl_2$
$Pt(NH_3)_4Br_2$
$Pt(NH_3)_4I_2$
$Pt(NH_3)_4SO_4$
$Pt(NH_3)_2Cl_2$
$Pt(NH_3)_2Br_2$
$Pt(NH_3)_2I_2$
$Pt(NH_3)_5Cl_4$
$Pt(NH_3)_5ClSO_4Cl$
$Zn(NH_3)_4(BF_4)_2$ $Co(NH_3)_6TlCl_6$
$Co(NH_3)_6InCl_6$
$[Co(NH_3)_6]_2(C_2O_4)_3 \cdot 3H_2O$
$[Co(NH_3)_6]_2(SO_4)_3 \cdot 3H_2O$
$[Co(NH_3)_6]_2(VO_3)_3 \cdot 3H_2O$
$[Co(NH_3)_5(H_2O)]_2SO_4 \cdot H_2O$
$Co(NH_3)_5(NO_2)Cl_2$
$Co(NH_3)_5(NO_2)Br_2$
$Co(NH_3)_5(NO_2)I_2$
$Co(NH_3)_5(NO_2)(NO_3)_2$
$Co(NH_3)_5(NO_3)Br_2$
$Co(NH_3)_5(NO_3)Cl_2$
$Co(NH_3)_5(NO_3)_3$
$Co(NH_3)_4(OH)Cl_2 \cdot H_2O$
$Co(NH_3)_4(OH)Br_2 \cdot H_2O$
$Co(NH_3)_4(OH)(H_2O)SO_4$ The metal ammine complexes which are used according to the invention are highly colored solids, decomposing at a temperature between about 100 and about 500° C. Preferred complexes are those which commence to decompose at a temperature range of about 150–350° C. The preparation and further characteristics of these complexes have been known in the art, as disclosed in J. Bjerrum and J. P. McReynolds, Inorganic Synthesis, volume 2, pp. 216–221 (1946) and in George Brauer, Handbook of Preparative Inorganic Chemistry, second edition, volume 2, pp. 1531–1540 (1965). For example, the cobalt hexamine chloride complex, $Co(NH_3)_6Cl_3$, may be prepared by reacting cobalt carbonate with hydrochloric acid and ammonia in the presence of activated charcoal and hydrogen peroxide. The product cobalt hexammine chloride complex is then recovered as a crystalline orange-colored precipitate.

In a preferred embodiment of the invention, M in Formula I above is cobalt. It is also preferred to utilize those complexes in which $p$ is 5 or 6, Y is Cl, Br, or $H_2O$, $t$ is 0 or 1, $s$ is 1, X is Cl or Br, and, $n$ is 0. Thus among the preferred complexes are the following $$Co(NH_3)_6Cl_3$$

$$Co(NH_3)_6Br_3$$

$$[Co(NH_3)_5Cl]Cl_2$$

$$[Co(NH_3)_5Br]Br_2$$

$$Co(NH_3)_5(H_2O)Cl_3$$

$$Co(NH_3)_5(H_2O)Br_3$$

In another preferred embodiment of the invention, the metal ammine complexes are utilized in combination with and as partial replacements for, antimony oxychloride, SbOCl, as a flame-retardant co-additive.

The utility of the metal ammine complexes as flame-retardant additives, whether alone or in combination with antimony oxychloride, is applicable to flexible, semi-rigid and rigid polyurethane foam compositions, the flexible foam compositions being preferred. In preparing the polyurethane foam, either the so-called "one-shot" method or the "semi-prepolymer" technique may be employed. Any combination of polyols, including polyether polyols and polyester polyols, organic polyisocyanates, foaming agents, catalysts, and other reactants capable of forming a polyurethane foam can be employed and the term "polyurethane foam forming composition," as used in the specification and claims herein, is meant to include any such combination. Typical formulations are described in U.S. Patents No. 3,072,582, issued Jan. 8, 1963, and No. 3,437,804, issued Oct. 17, 1967, and in Canadian Patent No. 705,938, issued Mar. 16, 1965.

While, as indicated above, both polyether and polyester polyols can be employed in the practice of this invention, preferred embodiments utilize the polyether polyols in the preparation of the polyurethane foam forming reaction mixture. To further illustrate suitable formulations, the polyether polyols, useful for the preparation of the polyurethane foams, include oxyalkylated polyhydric alcohols having a molecular weight in the range between about 700 and about 10,000 and preferably between about 1,000 and 6,000. The hydroxyl number of the polyether polyol is generally less than about 250 and preferably in the range between about 25 and about 175. These oxyalkylated polyhydric alcohols are generally prepared by reacting, in the presence of an alkaline catalyst, a polyhydric alcohol and an alkylene oxide such as ethylene oxide, propylene oxide, butylene oxide, amylene oxide, epichlorohydrin, and mixtures of these alkylene oxides, by either random addition or stepwise addition.

Polyhydric alcohols suitable for use in preparing the polyether polyol include ethylene glycol, pentaerythritol, methyl glucoside, propylene glycol, 2,3-butylene glycol, 1,3-butylene glycol, 1,5-pentane diol, 1,6-hexane diol, glycerol, trimethylol propane, sorbitol, sucrose, mixtures thereof and the like. If desired, a portion or all of the polyhydric alcohol may be replaced with another compound having at least two reactive hydrogen atoms, such as alkyl amines, alkylene polyamines, cyclic amines, amides, and polycarboxylic acids. Suitable alkyl amines and alkylene polyamines include methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine can also be used. Amides, such as acetamide, succinamide and benzenesulfonamide, constitute a further class of such reactive hydrogen compounds. A still further class of such reactive hydrogen compounds is the di- and polycarboxylic acids, such as adipic acid, succinic acid, glutaric acid, aconitic acid, diglycollic acid, and the like. It will be recognized that the reactive hydrogen compound can be one containing different functional groups having reactive hydrogen atoms, such as citric acid, glycollic acid, ethanolamine, and the like. Aromatic polyamines such as toluene diamine can also be employed. Mixtures of oxyalkylated polyhydric alcohols are also suitable for use in the process of this invention.

The organic polyisocyanates used in the preparation of the polyurethane foams include toluene diisocyanate, such as the 4:1 mixture or the 65:35 mixture of the 2,4- and 2,6-isomers, ethylene diisocyanate, propylene diisocyanate, methylene-bis-4-phenyl isocyanate, 3,3'-bitoluene-4,4'-diisocyanate, hexamethylene diisocyanate, naphthalene-1,5-diisocyanate, polyphenylene polymethylene isocyanate, mixtures thereof and the like. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.25 NCO groups per hydroxyl group, and preferably between about 0.9 and about 1.15 NCO groups per hydroxyl group.

The polyurethane foams are prepared in the presence of a foaming agent, reaction catalysts, and preferably a small proportion of a conventional surfactant. The foaming agent employed may be any of those known to be useful for this purpose, such as water, as well as organic foaming agents containing up to about seven carbon atoms such as the halogenated hydrocarbons, lower molecular weight alkanes, alkenes, ethers and mixtures thereof. Typical halogenated hydrocarbons include, but are not limited to: monofluorotrichloromethane, dichlorofluoromethane, difluorodichloromethane, 1,1,2-trichloro-1,2,2 - trifluoroethane, dichlorotetrafluoroethane, ethyl chloride, methylene chloride, chloroform, and carbon tetrachloride. Other useful foaming agents include lower molecular weight alkanes, alkenes and ethers such as methane, ethane, ethylene, propane, propylene, pentane, hexane, heptane, ethyl ether, diisopropyl ether, mixtures thereof, and the like. The amount of foaming agent employed may be varied within a wide range. Generally, however, the halogenated hydrocarbons are employed in an amount from about 1 to 50 parts by weight per 100 parts by weight of the polyol, and generally water is employed in an amount from about 1.0 to 6.0 parts by weight per 100 parts by weight of the polyol.

The polyurethane foams are prepared in the presence of a catalytic amount of a reaction catalyst. The catalyst employed may be any of the catalysts known to be useful for this purpose, or mixtures thereof, tertiary amines and metallic salts, particularly stannous salts. Typical tertiary amines include, but are not limited to, the following: N-ethyl morpholine, N-methyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Any catalytic proportion of catalysts may be employed. Preferably, a catalyst mixture comprising N-ethyl morpholine is employed. The other components of the catalyst mixture are preferably another amine and a metallic salt. The catalyst or catalyst mixture, as the case may be, is usually employed in an amount ranging between about 0.1 and about 3.0 percent, and preferably between about 0.5 and about 2.5 percent, by weight of the polyol.

It is preferred in the preparation of the polyurethane foams of the present invention to employ minor amounts of a conventional surfactant in order to further improve the cell structure of the polyurethane foam. Typical of such surfactants are the silicone oils and soaps, and the siloxaneoxyalkylene block copolymers. U.S. Patent 2,834,748 and T. H. Ferrigno, Rigid Plastic Foams (New York: Reinhold Publishing Corp., 1963), pp. 38–42, disclose various surfactants which are useful for this purpose. Generally up to 2 parts by weight of the surfactant are employed per 100 parts of the polyol.

Various additives can be employed which serve to provide different properties, e.g., fillers such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may be added.

In utilizing the metal ammine complexes in the polyurethane foam forming compositions of the invention, they are added, preferably in powder form, to the foam forming reaction mixture prior to foaming. Conveniently, they are blended with the polyols employed in making the foam, and the blend is then added to the other ingredients of the foam forming mixture.

The proportion of the metal ammine complexes employed in the polyurethane foam forming compositions of the invention may be any flame-retarding proportion, depending on the particular metal ammine complex and on the degree of flame-retardance desired, which proportion has no detrimental effect on the properties of the foam. Usually this proportion is based on the weight of total polyols employed in making the foam. Thus usually a proportion is employed which ranges from about 2 to about 60 parts per 100 parts by weight of total polyol. A preferred proportion is between about 10 and about 40 parts per 100 parts by weight of total polyol. Generally lower proportions are employed when a combination of the metal ammine complexes and antimony oxychloride is used.

Where antimony oxychloride is used as a co-additive with the metal ammine complexes, its proportion preferably ranges from about 2 to about 30 parts per 100 parts by weight of total polyol. A more preferred range is about 4–20 parts per 100 parts by weight of total polyol.

As indicated by Formula I and the illustrative compounds listed above, the metal ammine complexes which are utilized in the polyurethane foam compositions of the invention always contain at least one mole of ammonia in the molecule. While the invention is not intended to be bound by the following theory, it is believed that this ammonia is released in incrementally increasing amounts as the complexes commence to decompose upon heating. The released ammonia, which of course is non-flammable, has the effect of snuffing off the foam-consuming flame. Thus when a foam containing these complexes catches on fire, the resulting rise in temperature, e.g. over 100° C., causes the complexes to commence to decompose releasing incrementally increasing amounts of ammonia which acts to choke the flame. Furthermore, the decomposition of these complexes is characteristically endothermic. In other words, heat is absorbed by the decomposition of the complexes, which heat otherwise would act to raise the temperature of the unconsumed foam to the combustion point. Thus the use of the complexes of the invention as additives in polyurethane foam has two simultaneous effects when the foam catches on fire, namely, the generation of incrementally increasing amounts of a non-flammable gas which acts to choke the flame of the burning foam and the absorption of part of the heat generated by the flame.

As noted above, the metal ammine complexes utilized according to the invention are non-fugitive. Their flame-retardant effect is not substantially diminished with the passage of time. This non-fugitive property is conventionally tested by exposing the foam to accelerated aging conditions. Thus it has been found that after the foam, containing the complexes of the invention, is exposed to accelerated dry heat aging (i.e., 22 hours at 140° C.) or to accelerated humid aging (5 hours in a steam autoclave 250° F.), per ASTM D–1564–64T, its fire-extinguishing properties are not materially altered. It continues to be self-extinguishing. This property of the foam is tested according to ASTM D–1692–68. In this test, one end of a sample of foam 6 inches long, 2 inches wide, and ½ inch thick is exposed to the flame of a Bunsen burner. If a length of five inches or more of the sample is consumed by the flame, the foam is rated as burning" or not self-extinguishing. Otherwise, if less than 5 inches of foam are consumed by the time the flame is extinguished, then the foam is rated self-extinguishing," and the degree of flame-retardance is evaluated in terms of the extent of burn, i.e., the measured length of the foam sample which is consumed by the time the flame is extinguished.

The following examples are provided to illustrate the invention. In these examples, all parts and percentages are by weight, unless otherwise specified.

EXAMPLE 1

A flexible polyurethane foam forming formulation was prepared from the following ingredients in the indicated proportions:

| Ingredients: | Parts by weight |
|---|---|
| Oxypropylated glycerol (mol wt. 3000) | 100 |
| Toluene diisocyanate (80% 2,4 and 20% 2,6 isomers) | 50 |
| Water | 4 |
| N-ethyl morpholine catalyst | 0.5 |
| Silicone surfactant [1] | 1.5 |
| Triethylene diamine catalyst | 0.3 |
| Stannous octoate catalyst | 0.3 |
| Cobalt hexammine chloride complex, $Co(NH_3)_6Cl_3$, preground | 20 |

[1] Dow Corning DC–190.

All of the above ingredients, with the exception of the stannous octoate catalyst and the toluene diisocyanate, were first blended together. Then the stannous octoate was added. After stirring for about 15 seconds, the toluene diisocyanate was blended in, and the mixture was allowed to expand into a flexible foam.

The self-extinguishing property of the foam was tested according to ASTM D–1692–68. The foam was found to be self-extinguishing, the extent of burn, by the time the flame became extinguished, being 1.8 inches.

Except for the cobalt hexammine chloride, the polyurethane foam formulation of Example 1, which is substantially a standard, representative formulation, is employed throughout the remaining examples.

EXAMPLE 2

The identical procedure of Example 1 was followed except that instead of 20 parts of the cobalt hexammine chloride complex, 15 parts were used. Again the foam was found to be self-extinguishing, the extent of burn being 2.0 inches.

EXAMPLE 3

The identical procedure of Example 1 was followed using instead of 20 parts of cobalt hexammine chloride complex, 30 parts, of corresponding bromide complex, e.g., cobalt hexammine bromide. This complex was used as is, without pre-grinding. The resulting foam was again found to be self-extinguishing, with the extent of burn measured at 3.3 inches.

EXAMPLE 4

The identical procedure of Example 1 was followed but instead of 20 parts of cobalt hexammine chloride complex, 10 parts of a preground complex having the formula $$Co(NH_3)_5(H_2O)Cl_3$$

were used. The resulting foam was found to be self-extinguishing, and the extent of burn was measured at 2.8 inches.

To illustrate the utility of the metal ammine complexes used according to the invention as valuable flame-retardant co-additives with antimony oxychloride, SbOCl, Comparative Tests I–II and Examples 5–7 are provided.

Comparative Tests I and II

These tests were run exactly according to Example 1 except that instead of 15 parts of cobalt hexammine chloride complex, 10 parts of antimony oxychloride were used in Comparative Test I and 30 parts of antimony oxychloride were used in Comparative Test II. When the self-extinguishing properties of the respective resulting foams were tested, the foam of Comparative Test I failed the test (i.e., it burned and thus was not self-extinguishing), whereas the foam of Comparative Test II was found to be self-extinguishing. The results of these tests are recorded in Table I below.

EXAMPLES 5–7

The identical procedure of Example 1 was followed with these exceptions: instead of 20 parts of cobalt hexammine chloride complex, 10 parts of this complex plus 10 parts of antimony oxychloride were employed in Example 5; 15 parts of the cobalt hexammine chloride complex plus 6 parts of antimony oxychloride were employed in Example 6; and 20 parts of $Zn(NH_3)_4(BF_4)_2$ plus 10 parts of antimony oxychloride were employed in Example 7. In each case, the resulting foam was found to be self-extinguishing. The results are recorded in Table 1 below.

TABLE 1

| Foam tested | Ammine complex/parts used | Parts SbOCl | Rating | Extent of burn (ins.) |
|---|---|---|---|---|
| C.T. I | None | 10 | B | |
| C.T. II | do | 30 | S.E. | 3.7 |
| Example 5 | Co(NH$_3$)$_6$Cl$_3$/10 | 10 | S.E. | 1.9 |
| Example 6 | Co(NH$_3$)$_6$Cl$_3$/15 | 5 | S.E. | 3.5 |
| Example 7 | Zn(NH$_3$)$_4$(BF$_4$)$_2$/20 | 10 | S.E. | 3.8 |

As seen from the data in Table 1 above, the metal ammine complexes employed according to the invention, when used in combination with antimony oxychloride as a co-additive, are highly effective flame-retarding agents for polyurethane foam. Furthermore, their inclusion in the polyurethane foam forming formulation reduces the amount of antimony oxychloride which is required to impart flame retardance to the foam. Thus whereas 10 parts of antimony oxychloride alone resulted in a burning foam (C.T. I), when 10 parts of this antimony oxychloride (Examples 5 and 7) or even as little as 5 parts (Example 6) are used in combination with the complexes of the invention, the resulting foams are self-extinguishing.

EXAMPLES 8–9

These examples are provided to demonstrate the non-fugitive nature of the metal ammine complex additives as used in the invention. In Example 8, a portion of the foam prepared in Example 1 was subjected to accelerated dry heat aging according to ASTM D–1564–64T, by placing it in a 140° C. atmosphere for 22 hours. The foam was then cooled and its self-extinguishing property was tested. It was found to have substantially the same degree of flame retardance as obtained in Example 1 before the foam had been dry heat aged.

Another portion of the foam prepared in Example 1 was subjected to accelerated humid aging according to ASTM D–1564–64T, by placing it in a steam autoclave for 5 hours. After removal from the autoclave and drying, this foam was again tested for its fire-extinguishing properties. It was found to be self-extinguishing with a slightly increased extent of burn as compared with the foam as tested in Example 1 before aging. Thus here the extent of burn was 2.7 inches as compared with 1.8 inches before aging.

What is claimed is:

1. A polyurethane foam prepared from a composition comprising a polyol, an organic polyisocyanate, a foaming agent and a flame retarding amount of a transition metal ammine complex, which complex commences to decompose and release ammonia at a temperature ranging from about 100 to about 500° C.

2. The polyurethane foam of claim 1 wherein said metal ammine complex has the formula $$Co(NH_3)_6Cl_3$$

3. The polyurethane foam of claim 1 wherein said polyol is a polyether poloyl.

4. The polyurethane foam of claim 3 wherein said foam is flexible.

5. The polyurethane foam of claim 1 wherein said temperature range is from about 150 to about 350° C.

6. The polyurethane foam of claim 1 wherein said composition also comprises from about 2 to about 30 parts of SbOCl per 100 parts by weight of said polyol.

7. The polyurethane foam of claim 1 wherein said transition metal ammine complex has the formula $$[M(NH_3)_pY_t]_sX_r \cdot nH_2O$$

wherein

M is a transition metal, p is an integer from 1 to 6,

Y is selected from the group consisting of $Cl^-$, $Br^-$, $I^-$, $C_2O_4^{-2}$, $NO_2^-$, $NO_3^-$, $OH^-$, $H_2O$, and mixtures thereof, t is an integer from 0 to 3, s is 1 or 2, X is an anion selected from the group consisting of $Cl^-$, $Br^-$, $I^-$, $PO_4^{-3}$, $HPO_4^{-2}$, $H_2PO_4^-$, $B_4O_7^{-2}$, $BO_2^-$, $SO_4^{-2}$, $C_2O_4^{-2}$, $WO_4^{-2}$, $MoO_4^{-2}$, $VO_3^-$, $BF_4^-$, $NO_3^-$, $TiCl_6^{-2}$, $InCl_6^{-3}$, $ReO_4^-$, $PtCl_4^{-2}$, $PtCl_6^{-2}$, $PdCl_4^{-2}$, $CO_3^{-2}$, $SiF_6^{-2}$, and mixtures thereof, r is an integer from 1 to 3, and n is 0 to 3.

8. The polyurethane foam of claim 7 wherein said composition also comprises a reaction catalyst.

9. The polyurethane foam of claim 8 wherein said polyol is a polyether polyol and said temperature ranges from about 150 to about 350° C.

10. The polyurethane foam of claim 9 wherein said composition also comprises from about 2 to about 30 parts of SbOCl per 100 parts by weight of said polyol.

11. The polyurethane foam of claim 7 wherein M is a transition metal having an atomic number between 24 and 30.

12. The polyurethane foam of claim 11 wherein
$p$ is 5 or 6,
Y is selected from the group consisting of Cl$^-$, Br$^-$ and H$_2$O,
$t$ is 0 to 1,
$s$ is 1,
X is Cl or Br, and
$n$ is 0.

13. The polyurethane foam of claim 12 wherein said temperature ranges from about 150 to about 350° C.

14. The polyurethane foam of claim 13 wherein said polyol is a polyether polyol.

15. The polyurethane foam of claim 14 wherein said foam is flexible.

16. The polyurethane foam of claim 15 wherein said polyether polyol is an oxyalkylated polyhydric alcohol having a molecular weight range of about 1000–6000.

17. The polyurethane foam of claim 16 wherein M is cobalt.

18. The polyurethane foam of claim 16 wherein said flame retarding amount ranges from about 10 to about 40 parts per 100 parts by weight of said polyol.

19. The polyurethane foam of claim 18 wherein said metal ammine complex has the formula $$Co(NH_3)_6Cl_3$$

20. The polyurethane foam of claim 19 wherein said catalyst comprises N-ethyl morpholine.

21. The polyurethane foam of claim 20 wherein said organic polyisocyanate is toluene diisocyanate.

22. The polyurethane foam of claim 21 wherein said composition also comprises from about 4 to about 20 parts of SbOCl per 100 parts by weight of said polyol.

References Cited

UNITED STATES PATENTS 3,549,564  12/1970  Parker et al. _____ 260—2.5
3,262,894  7/1966   Green _____ 260—2.5

DONALD E. CZAJA, Primary Examiner

H. S. COCKERAM, Assistant Examiner

U.S. Cl. X.R.
260—2.5 R, 77.5 SS